(12) United States Patent
Hagenzieker

(10) Patent No.: US 6,575,686 B2
(45) Date of Patent: Jun. 10, 2003

(54) CARGO-TRANSFER APPARATUS AND METHOD

(76) Inventor: William Hagenzieker, 5 Oceanview La., Rockport, ME (US) 04856

( * ) Notice: Subject to any disclaimer, the term of this patent is extended or adjusted under 35 U.S.C. 154(b) by 0 days.

(21) Appl. No.: 09/809,620

(22) Filed: Mar. 15, 2001

(65) Prior Publication Data

US 2002/0031418 A1 Mar. 14, 2002

Related U.S. Application Data

(63) Continuation-in-part of application No. 09/661,718, filed on Sep. 14, 2000.
(60) Provisional application No. 60/153,707, filed on Sep. 14, 1999.

(51) Int. Cl.$^7$ .................................................. B60P 7/00
(52) U.S. Cl. ................. 414/139.4; 414/814; 414/522; 410/66; 410/67
(58) Field of Search .................... 414/139.4, 814, 414/522; 410/66, 67, 26, 24, 92; 296/26.09, 26.13

(56) References Cited

U.S. PATENT DOCUMENTS

| | | | | |
|---|---|---|---|---|
| 426,385 A | * | 4/1890 | Jones | ........................ 414/814 |
| 1,872,823 A | * | 8/1932 | Sanford | ...................... 414/814 |
| 2,678,139 A | * | 5/1954 | Gildersleeve | ............... 414/522 |
| 3,010,409 A | * | 11/1961 | Good et al. | .................... 410/67 |
| 4,000,870 A | * | 1/1977 | Davies | ........................ 410/92 |
| 4,231,695 A | * | 11/1980 | Weston | ........................ 410/69 |
| 4,278,395 A | * | 7/1981 | Thunell | ...................... 414/814 |
| 4,388,030 A | * | 6/1983 | Skaale | .......................... 410/92 |
| 4,832,560 A | | 5/1989 | Harp | |
| 4,919,582 A | | 4/1990 | Bates et al. | |
| 4,929,133 A | * | 5/1990 | Wiseman | ..................... 410/67 |
| 5,044,866 A | | 9/1991 | Harp | |
| 5,129,778 A | | 7/1992 | Harp | |
| 5,454,672 A | | 10/1995 | Halpin et al. | |
| 5,934,725 A | * | 8/1999 | Bowers | ...................... 414/522 |
| 6,059,339 A | * | 5/2000 | Madson | ...................... 414/522 |
| 6,065,792 A | * | 5/2000 | Sciullo et al. | .............. 414/522 |

* cited by examiner

*Primary Examiner*—Kathy Matecki
*Assistant Examiner*—Sang Kim
(74) *Attorney, Agent, or Firm*—Patricia M. Mathers; Thomas L. Bohan

(57) ABSTRACT

Apparatus and method for cargo transfer. A cargo sled is stuffed into/stripped from a container. The method encompasses a marine terminal that stores sleds prior to stuffing into a container. Method and apparatus reduce the required number of cargo containers by up to a factor of eight.

15 Claims, 6 Drawing Sheets

FIG. 6
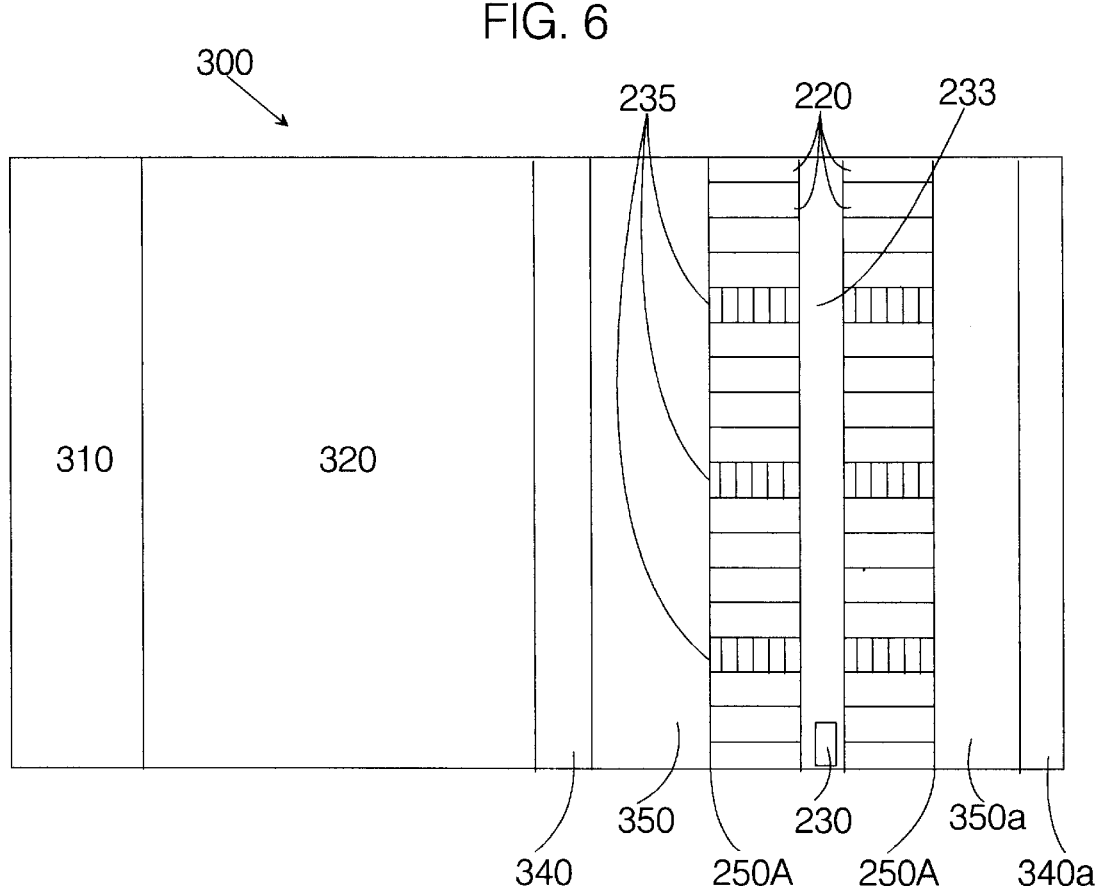
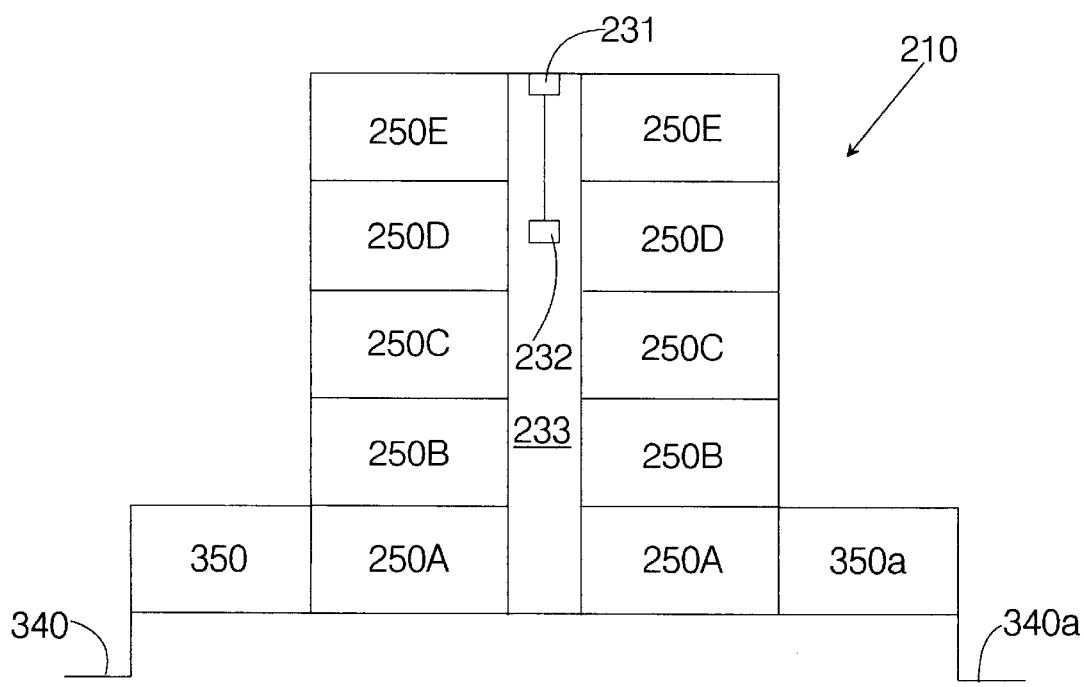

CARGO-TRANSFER APPARATUS AND METHOD

This application is a continuation-in-part of U.S. application Ser. No. 09/661,718, filed Sep. 14, 2000, which in turn claims the benefit of U.S. Provisional Application No. 60/153,707, filed Sep. 14, 1999.

BACKGROUND OF THE INVENTION

1. Field of the Invention

The present invention relates to cargo transportation. More specifically, the present invention relates to the movement of cargo between the various modes by which it is transported. More specifically yet, the present invention relates to an apparatus and method for moving cargo into and out of cargo containers at shipping terminals and in particular at terminals for ocean-going shipping; storage of cargo; and delivery of inbound cargo and receipt of outbound cargo.

2. Description of Prior Art

For the past fifty years, much of world-wide shipping of goods has taken place in the form of containerized cargo. The containerized cargo method involves the filling of a container—usually of a standardized size and shape—with goods at the goods' point of origin and then leaving the goods in that container until they reach their point of destination. In general there will be a number of intermediate way-stations to which the containers are taken. Key among these way stations are usually the shipping terminals at which the cargo-filled container begins or concludes the ocean or sea-going segment of its journey from origin to destination. For the sake of definitiveness in this discussion, these shipping terminals will be taken to be terminals for ocean-going cargo ships, that is, marine terminals.

The containers in question are either 20 or 40 feet in outside length, with an outside width of 96 inches and a usual outside height of 8.5 feet. In general, each of them will be filled, also called "stuffed", with numerous items, on pallets or not. This "stuffing" is, as stated, carried out at the point of origin and is generally carried out by a combination of manual and machine operations, using fork-lifts and the like. Thus, the stuffing operation can be a tedious and often dangerous operation for the workers and equipment, one that always has a certain risk of damaging the container itself.

The containers generally have no rollers or other means to make them easily moved from one location to the next. They therefore often require rollable chassis on which to be moved, for example, from the point of delivery at a terminal to the point where they are going to be loaded onto the ship.

At the conclusion of the ocean voyage the process is reversed, and the cargo-filled container is lifted from ship to ship-side, ultimately to be moved to and placed on ground transportation. Finally, with perhaps another intermediate stop, the cargo-filled container arrives at its point of destination where the container is emptied ("stripped") of its goods, again through a combination of manual and mechanized effort.

The usual situation is that at the point of destination for the goods in a particular container there are no goods with which to load the container for its return trip. Consequently, most containers return empty to the marine terminal. This is an inefficient use of transportation equipment, be it land-, air-, or ocean-based. There is an additional built-in disadvantage where trucks are concerned, regardless of whether the containers being carried are filled or empty, and that is that the size of the containers, standardized decades ago at 35 or 40 feet, is smaller than the size allowed to be pulled on the highways today. Modern semi-trailers have outside widths of 102 inches and, commonly, lengths of 53 feet. Thus, semi-trailers are often underutilized, because they are pulling 35 or 40 foot containers when they could be pulling 53 foot containers. This means that the trucking industry significantly under-utilizes the highways by having trucks pull a lower shipping volume than allowed, yet overloads the highways by using more trucks than are necessary for the volume of goods being transported.

As can be seen, many disadvantages—some of them not present originally—are associated with traditional containerized shipping. In addition to the ones set out above and to be summarized below, another even more significant one needs to be added, one connected to the dynamics of shipping. To see this, picture the cargo vessel as having a certain number of slots for containers. To maximize the use of assets tied up in this vessel, it must—to the extent practicable—be continually engaged in crossing the ocean with a full load of cargo, that is, fully loaded with filled cargo containers. Even ignoring container loss due to damage during the inland stuffing, stripping, and transportation, it is estimated that for this continual ocean-going activity to be maintained there must be a total of five containers to "support" every container slot on the ship. It is clear, for example, that within the 24–72 hour turn-around time of a ship in port, there must be a stuffed container available at the terminal to take the place of the stuffed container just off-loaded from the arriving ship. Furthermore, since the land shipment round trip often takes more time than the ocean round trip, there must already be a third filled container in transit toward the terminal as the re-loaded ship departs. In addition and as noted above, the full container that arrives at its destination and is stripped will not in general have goods ready at that point for re-stuffing; it must therefore be carried empty to another source of goods. And so forth. Moreover, the volume of cargo trade is very often physically imbalanced and, as a result, containers must frequently be "repositioned," that is, moved as empty containers from a location of lower volume to a trading location of higher volume. This "repositioning" is a significant factor in the high cost of the present method of transporting cargo.

The need for such a large number of "support" containers for each container slot has a number of costs in addition to that associated with having capital tied up in the containers. These containers must be stored somewhere during their transit, stuffed or empty. This means that valuable real estate is taken up as an inherent feature of the present cargo transport method. Furthermore, to address the damage problem, the more containers there are, the more containers will be damaged each year to the point where they need to be replaced. This replacement-requiring damage occurs while the containers are being moved on and off rolling stock, while they are being move and stacked in storage areas, etc.

In short, the basic idea of 50 years ago, introduced to reduce perceived widespread loss in shipment no longer works economically in the modem world. A number of attempts have been made to "patch" the problem. These include the following. A method and apparatus for loading automobiles into a cargo container is taught by Bates et al. (U.S. Pat. No. 4,919,582). An apparatus and methods for containerizing and de-containerizing a load is taught by Harp (U.S. Pat. No. 4,832,560; 1989). A similar apparatus is taught by Harp (U.S. Pat. No. 5,044,866; 1991). Harp (U.S. Pat. No. 5,129,778; 1992) teaches a method and assembly for "one-step" loading and unloading using essentially the invention taught in Harp '560 and Harp '866. An adjustable load-carrying apparatus for fully utilizing transport enclosure space is taught by Halpin et al. (U.S. Pat. No. 5,454, 672; 1995). Nevertheless, none of these prior art solutions really solves the problems set out above.

Therefore, what is needed is a way to reduce the costs, human and economic, inherent in the container-stuffing and -stripping of the present shipping process. What is further needed is a way to reduce the inefficiencies inherent in the mis-fit between container size and cargo-space of land-transportation means. What is yet further needed is a way to reduce the total number of containers needed to support each container slot of a working cargo ship, thereby reducing the total world container inventory, to increase asset utilization of marine terminals and inland transportation, and optimize the infrastructure.

SUMMARY OF THE INVENTION

Believing that what is needed is not a "patch" but a complete shift in the worldwide approach to cargo shipping, the present inventor presents an invention built around a "container sled" apparatus and method for using same. The heart of the invention is a sled that is loaded with cargo at the marine terminal, cargo that has been transported by inland means from its point of origin without having to have been stuffed into a container. Once the container sled is loaded, it is moved to the container and inserted into the container. The container is next placed on-board the ship. At the conclusion of the ocean voyage, the process is repeated in reverse, the sled is removed from the container and moved to a location in the terminal where the goods on the sled can be transferred to the ground transportation, leaving the sled behind in the terminal. Before being loaded onto a ship or ground transportation, the sled may be placed in a storage facility at the terminal to await further processing.

Thus, the present invention is made up of both a device (the container sled) and a method that together provide a potential for changing the current large-scale shipping procedures in such as way as to reduce significantly the human and economic cost of cargo-handling at the points of origin and destination of the goods and in such a way as to drastically reduce the numbers of containers needed and to eliminate intermediate pieces of equipment on which to convey containers from one location to another.

More particularly, the apparatus of the present invention is a platform having outer dimensions approximately equal to the inner dimensions of standard containers, a platform in which extendable support rollers, for example, casters, are embedded on the underside so as to make the platform easily rollable across any reasonably smooth surface, such as the floor of a container or of a warehouse floor. By its nature, the support roller arrangement is able to support the weight of the fully loaded platform. Although in the Preferred Embodiment of the present invention, the support rollers are casters deployed by means of a threaded rod that runs the length of the sled and a linkage system attached to this rod, any of a variety of known means for deploying and maintaining these casters will occur to one skilled in the art upon reading the description of the present invention as presented herein.

At equal spaced intervals around the perimeter of the platform may be a number of spring-loaded guide rollers that serve to help keep the container sled centered, or in general, laterally stable, while within a container. The platform may further include removable upright members that spaced around the platform perimeter to serve as aids in platform loading. Each of these upright members may also have a spring-loaded guide roller attached to its top end, to provide similar service to that of the guide rollers deployed around the perimeter of the platform.

Although, in one sense, the method of the present invention is an entire new shipping protocol—point-of-origin to point-of-destination—built around the container sled, its heart lies specifically in the process by which cargo coming into a marine terminal is transferred from ground transport to a container sled and then to the ship, a process that will be mirrored at the marine terminal located at the other end of the cargo's ocean voyage. In that sense, the method of the present invention includes the steps of taking cargo that has arrived by land transport, loading it onto a container sled, and moving the cargo-laden container sled to a temporary holding location from which it is subsequently moved into a container, i.e., the cargo-laden container sled is used to stuff the container, and situating the thus-stuffed container into its slot on the ship. At the other end of the ship run, it includes moving the sled with attendant cargo out of the container i.e., stripping the container, moving the container sled to a cargo holding point and then, from the holding point to surface transport that will move the cargo on toward its point of destination, after which the emptied container sled may be re-loaded with new cargo headed the other way, etc.

Throughout this Summary, reference to "containers" or "cargo containers" can also be understood as not being limited to those containers commonly used with ocean-going vessels, or to any specific industry. For example, "containers" also includes those insulated and/or refrigerated containers, commonly referred to as "Reefer" containers, that are used for transporting perishable or frozen cargo. "Container" can further mean truck trailers of any size, equipped for dry cargo or refrigerated cargo as used, for instance, in the "roll-on, roll-off" (Ro-Ro) cargo transport industry.

DESCRIPTION OF THE DRAWINGS

FIG. 6 shows a warehouse adapted for use in the goods-conveying method of the present invention.

DETAILED DESCRIPTIONS OF THE EMBODIMENTS OF THE PRESENT INVENTION

The following description of the Preferred Embodiment is directed to its use with common commercial cargo containers. Because commercial cargo containers are usually 40 feet in length and 96 inches in width, the container sled of the Preferred Embodiment has a length of approximately 39.5 feet (474 inches) and a width of between 88.5 and 92 inches all so as to fit snugly within the internal dimensions of the standard commercial cargo container. In the Preferred Embodiment, the container sled is designed by the appropriate choice and sizing of material to have a "life load" of 56,000 lbs. (This means that the sled can withstand at least 10,000 cycles of being loaded/unloaded with a load of 56,000 lbs.) Obviously, the present invention is not limited to use with a certain type or size of container.

Figure 1:
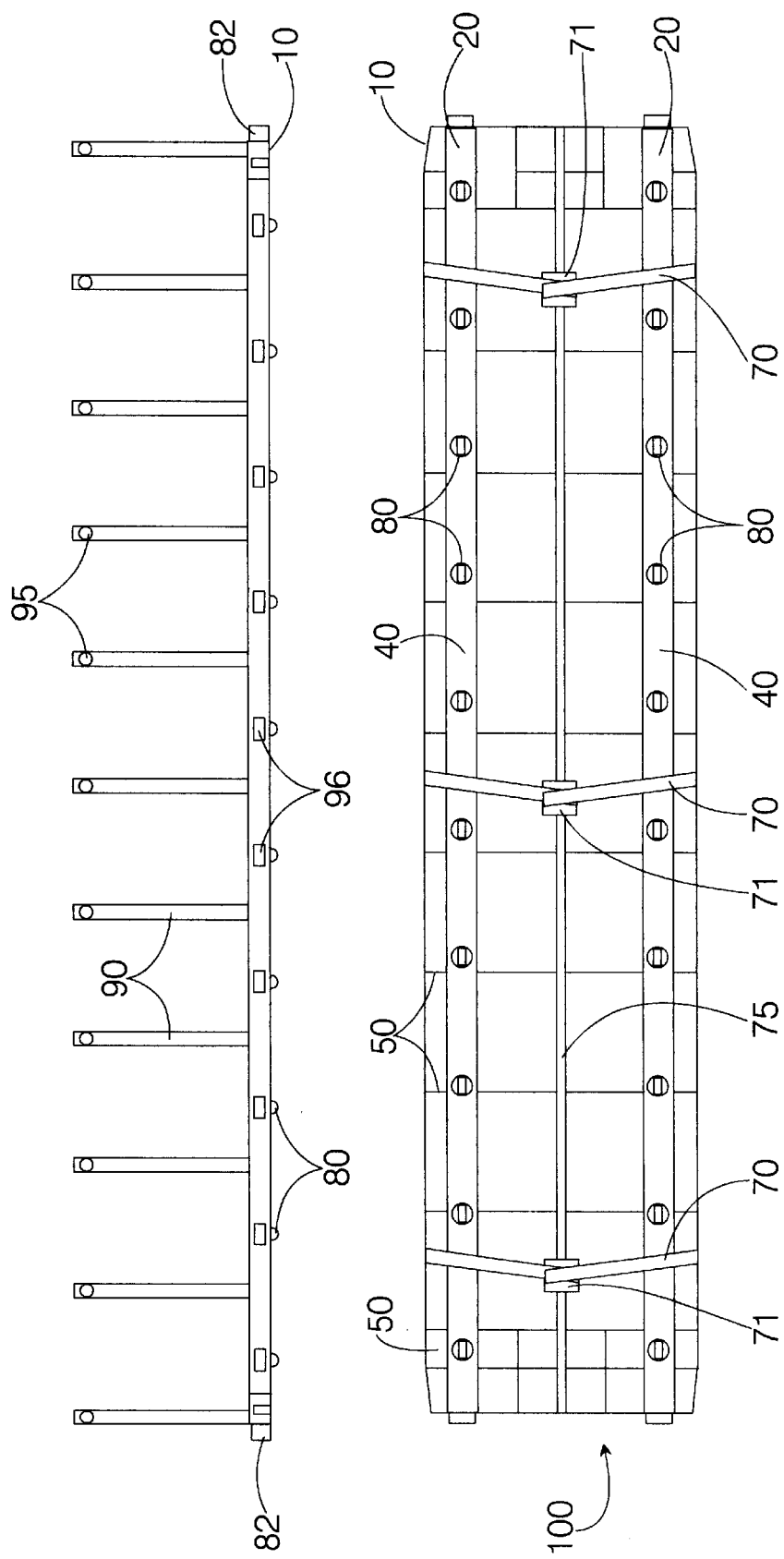
FIG. 1 shows bottom, side, and end views of the container sled that constitutes the Preferred Embodiment apparatus of the present invention, including in particular a depiction of the casters and their reversible deployment mechanism.
Figure 2:
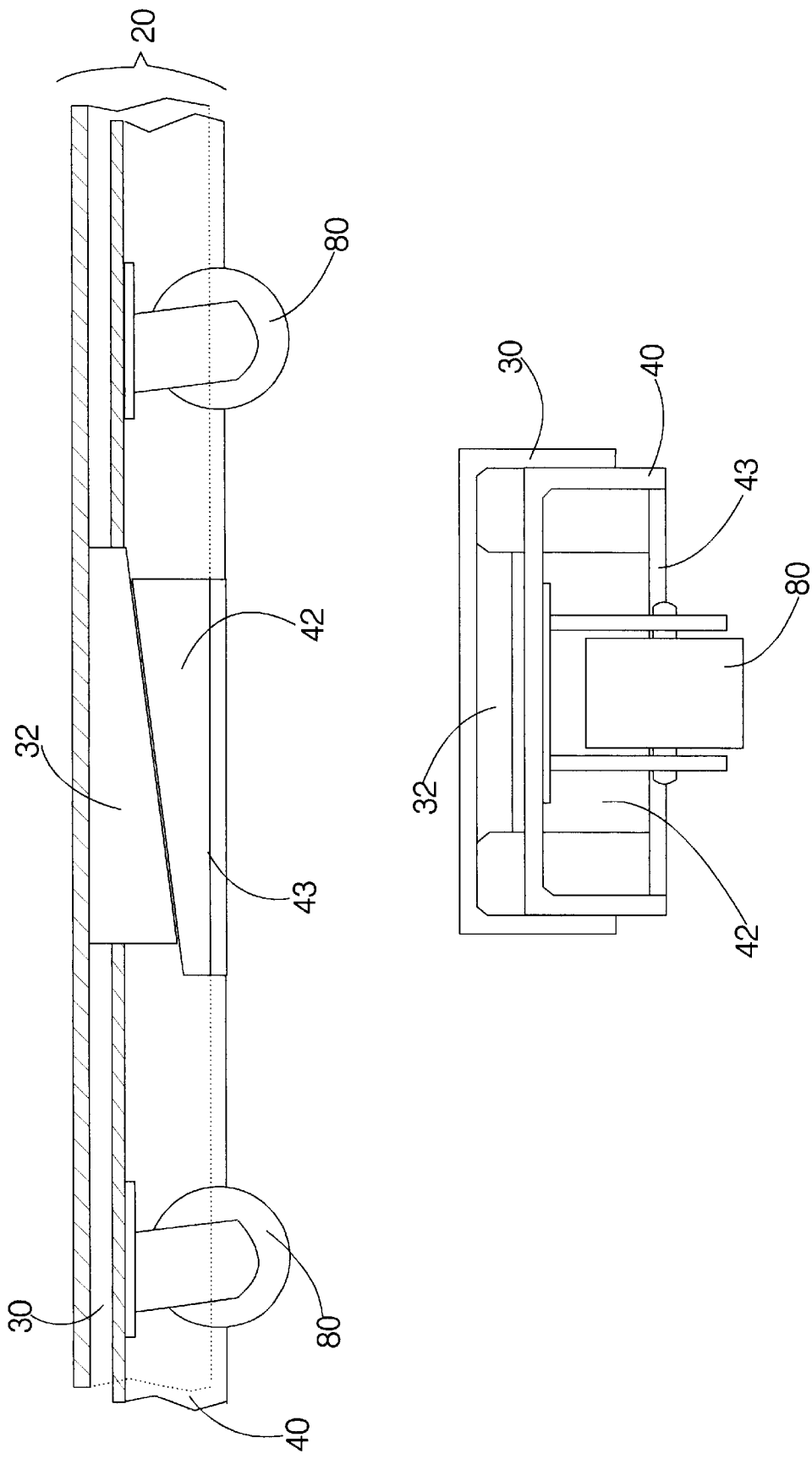
FIG. 2 shows the upper/lower channel pair assembly of the apparatus of the Preferred Embodiment of the present invention and more detail of the raising and lowering of the casters.

FIG. 1 shows the container sled 100 of the Preferred Embodiment of the present invention in side, bottom, and end views, respectively. With reference to FIG. 1 and FIG. 2, it can be seen that two channel assembles 20—each having an upper channel 30 and a lower channel 40—run the length of the longitudinally extended platform 10 that constitutes the major part of the container sled 100. One of the channel assemblies 20 runs along the left side of the container sled 100 and one along the right. Attached in a transverse manner to the upper channels 30 are a number of beams 50. These beams 50 are parallel to one another. Attached to the top of each of the beams 50, i.e., the side of the beam not directly adjacent to one of the upper channels 30, is a support surface 60 on which cargo is to be loaded prior to the container sled 100 being moved into a cargo container, shown in part in FIG. 4. To prevent cargo from sliding sideways on the support surface 60 during transit, notches (not shown) 3 inches long and ½ inch wide lined with steel grommets are placed over the full length of the support surface 60 at two-foot intervals. Through these notches either strapping or quick-release-type lashings can be introduced to secure the cargo relative the support surface 60.

A caster-linkage system designed to permit the container sled 100 to be freely rolled in a traditionally configured container is indicated in the central view of FIG. 1. It includes transverse links 70 each of which is pivotably connected at one end to one of a plurality of collars 71 that are threaded onto a threaded rod 75 that runs the length of the container sled 100. The threaded rod 75 is positioned along the midline of the container sled 100 and accessible at each end of the container sled 100 so that casters 80—that in the Preferred Embodiment have a diameter of between two and four inches—attached to each of the lower channels 40 may be deployed by rotation of the threaded rod 75. This rotation, either clockwise or counterclockwise, is performed in the method of the Preferred Embodiment of the present invention by the use of pneumatic power tools. The remaining end of each of the links 70 is pivotably connected to the container sled 100, and a middle portion of each of the links 70 is attached to one of the lower channels 40. In this way, when the threaded rod 75 is caused to turn, the collars 71 move longitudinally relative to the threaded rod 75, and each link is caused to move in angular motion; the ends attached to the container sled 100 undergo no displacement.

Paying particular attention to the side and end views, respectively, of the container sled 100 (top and bottom drawings, respectively, in FIG. 1), a number of removable upright members 90 can be observed attached along the perimeter of the container sled 100 at evenly spaced intervals. These upright members 90 serve two purposes: to help keep cargo on the support surface 60 of container sled 100, and to help keep the container sled 100 centered within the surrounding container. Spring loaded upper guide-rollers 95 are positioned at the top end of each of the upright members 90. An additional set of these spring-loaded guide-rollers, lower guide-rollers 96, is attached to the container sled 100 itself and spaced along its perimeter at even intervals. These additional spring-loaded guide-rollers 96 further serve to keep the container sled 100 centered within a container both as it is being introduced to the container and during transit.

FIG. 2 shows in detail both a side view and an end view of a portion of one of the channel assemblies 20, including one of the upper channels 30 and one of the lower channels 40. Each of the upper channels 30 and each of the lower channels 40 is constructed from C-channel stock. A number of upper-channel ramp-blocks 32 is attached at evenly spaced intervals along the upper channels 30. For the purpose of illustration, only one of these upper-channel ramp-blocks 32 is shown in FIG. 2. Each of the upper-channel ramp-blocks 32 has a cross-section in the shape of a truncated right-triangle, the hypotenuse of which is presented to one of a set of underlying lower-channel ramp-blocks 42, as is shown in the side view of FIG. 2. Each of the lower channels 40 fits within the open side of one of the upper channels 30. The lower-channel ramp-blocks 42 are attached at evenly spaced intervals, with the same spacing as that of the upper-channel ramp-blocks 32, to each of the lower channels 40. Each of the lower-channel ramp-blocks 42 has a cross-section in the shape of a truncated right triangle, the hypotenuse of which is supplementary to the hypotenuse of the overlying upper-channel ramp blocks 32. Each of the lower-channel ramp-blocks 42 is attached to a plate 43 that in turn is attached across the open side of the lower channels 40. Casters 80 are attached to the underside of the lower channel 40, in such a manner that each of the casters 80 is free to rotate 360° about a vertical axis. Because of the supplementary nature of the mating hypotenuses of the upper and lower ramp blocks, the casters 80 are deployed when the threaded rod 75 is caused to turn in one direction, i.e., clockwise, and, alternately, retracted when the threaded rod 75 is caused to turn in the opposite direction, i.e., counter-clockwise.

Figure 3:
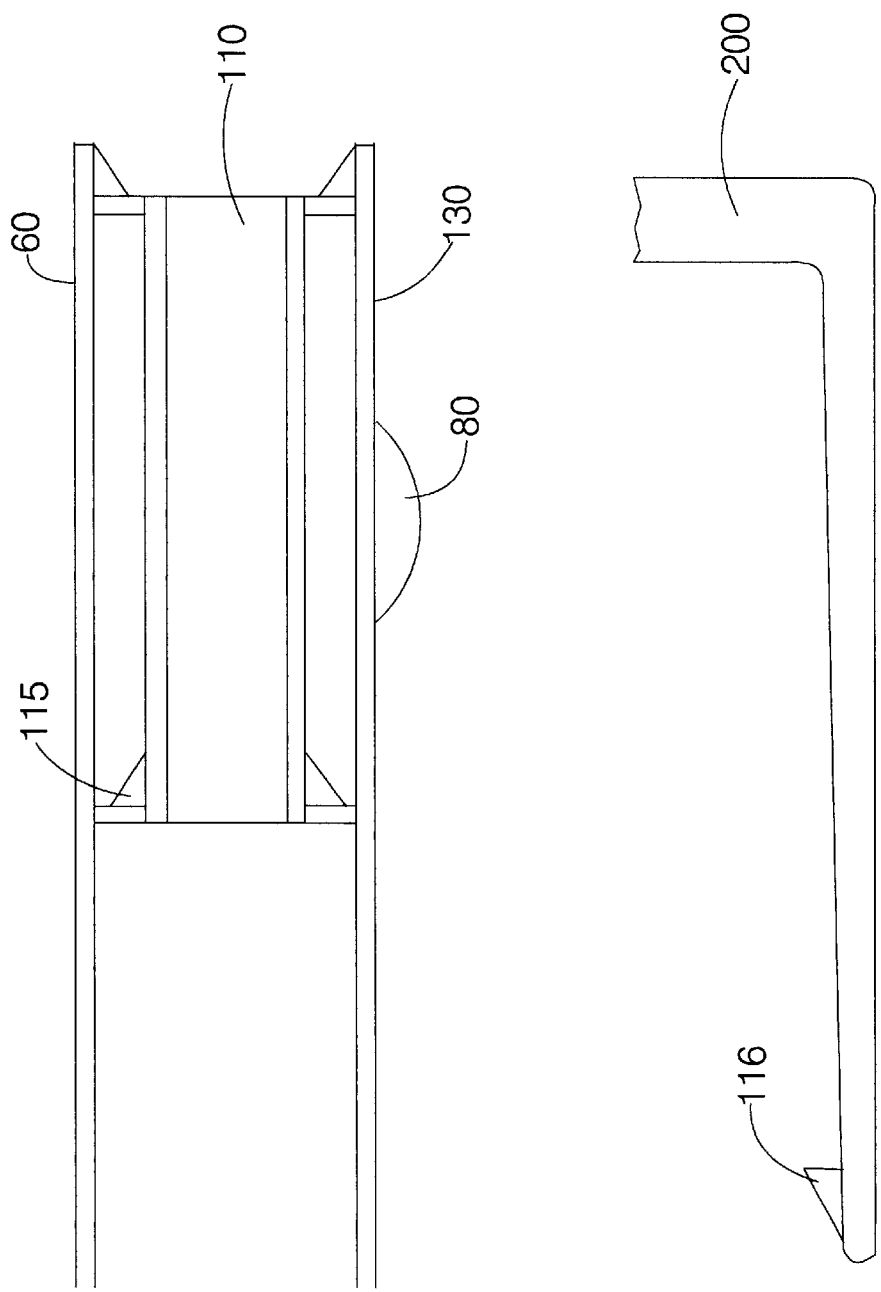
FIG. 3 shows, at one end of the apparatus of the Preferred Embodiment, the receiving pocket and the modified fork-lift blade used in conjunction with it in moving the container sled of the Preferred Embodiment of the present invention.

In the Preferred Embodiment apparatus, a pair of fork-blade pockets 110 is located at each end of the container sled 100, fore and aft. Detail of these fork-blade pockets 110 can be seen with reference to FIG. 3, which depicts one of the fork-blade pockets 110 as recessed between the support surface 60 and a lower surface 130 of the container sled 100. Each of the fork-blade pockets 110 is adapted to receive a fork-blade, and, in the Preferred Embodiment, each can also receive and accommodate, by means of a slot 115, a catching-bar 116 attached to the distal end of a modified fork-blade 200. This slot 115 prevents the container sled 100 from disengaging from the modified fork-blade 200 when the forklift is moved backwards.

In the method of the Preferred Embodiment of the present invention, cargo is delivered to a marine terminal from a inland transport means, i.e., air-, or ground-transport, but usually a truck. It is then loaded onto a container sled 100 until the container sled 100 is filled, at which time or shortly thereafter a fork-lift with a pair modified blades 200 approaches the container sled 100 and slips its pair of modified fork-blades 200 into a pair of fork-blade pockets 110 so as to affirmatively couple to the container sled 100. In the meantime, the casters 80, which were retracted during the filling of the container sled 100 are deployed so as to make the container sled 100 mobile. The fork-truck is then used not to lift the sled but to shuttle it horizontally across and through the marine terminal until it reaches a standardized container. The fork-truck is then used to usher the loaded container sled 100 into the standardized container, after which it disengages from the loaded container sled 100. The casters 80 on the bottom of the container sled 100 are then retracted, by the means described earlier, using a pneumatic tool and the container sled 100 then sits securely on the floor of the container. The container in turn is then placed aboard the ship by the usual well-known methods for such maneuvers. At the marine terminal at the other end of the ship's voyage, the process is reversed.

In an alternate preferred embodiment of the apparatus of the present invention, the guide rollers are affixed to the container and neither guide rollers nor casters are present on a container sled 101. There are a number of other features added to the sled 101 to accommodate this change. This other embodiment is depicted in FIG. 4 and FIG. 5.

Figure 4:
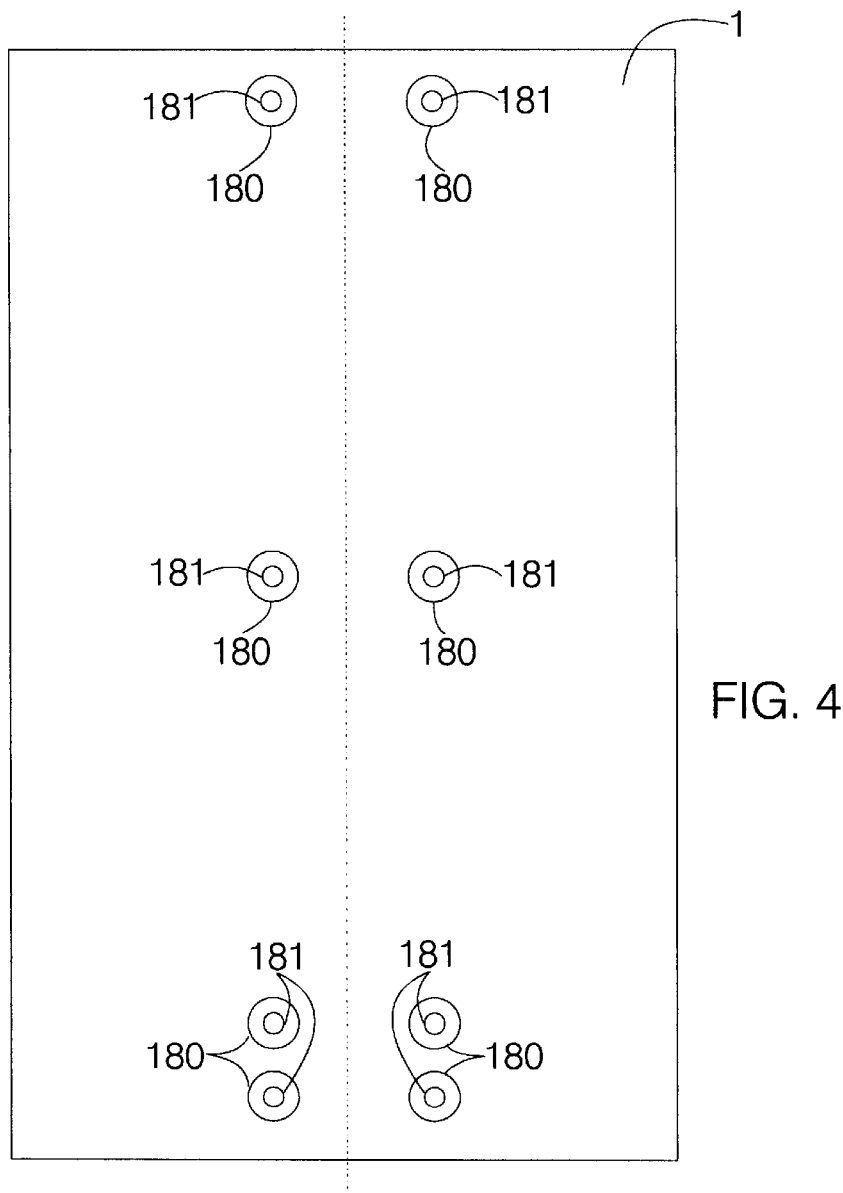
FIG. 4 shows a plan view of the guide rollers used in an alternative embodiment of the apparatus of the present invention.
Figure 5:
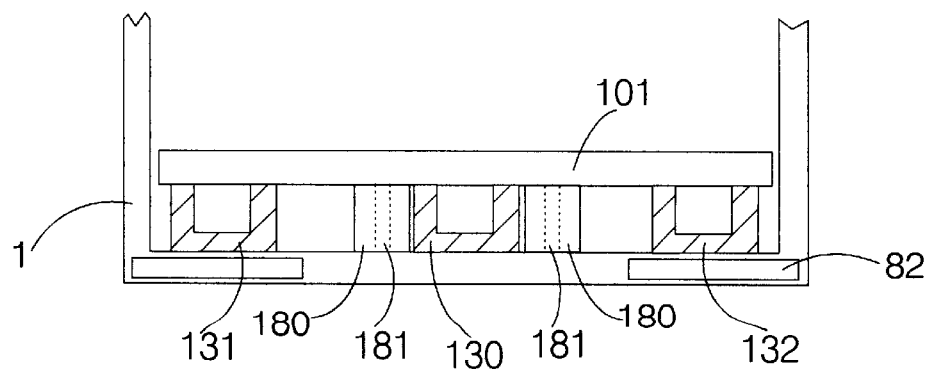
FIG. 5 shows the front view of guide rollers mounted on the floor of a container modified to accept a sled in accordance with the present invention, illustrating the relationship the guide rollers have to the center members of the sled platform corresponding to a particular embodiment of the apparatus of the present invention.

FIG. 4 shows a plan view of the alternate apparatus, showing eight floor guide rollers 180 that are each mounted on one of guide posts 181. These guide posts 181 are in turn mounted to the floor of a container 1. These floor guide rollers 180 are configured in pairs and are mounted on the floor of the container 1 in a manner such that each pair straddles the longitudinal midline of the container 1. Running between sets of floor guide rollers 180 when the container sled 101 is introduced to the container are certain elements affixed to the bottom of the container sled 101, namely a left sled rail 131, a central sled rail 130, and a right sled rail 132, each of which runs the length of the container sled 101. All three sled rails are shown in end view in FIG. 5. The guide rollers 180 that guide and control the central sled rail 130. Also indicated in FIG. 5 is the fact that the container sled 101 no longer is equipped with casters 80. See FIG. 1. This embodiment is, therefore, suited for use with a pallet jack. Ideally, the pallet jack would have tines approximately 40' in length, so that it can reliably lift the container sled 101. Although such pallet jacks are not currently on the market, the technology to make them is already available. It is also possible to use half-size sleds that can be lifted with already known pallet jacks having 18' long tines, and that two sleds 101 be stuffed into a container.

Figure 7:
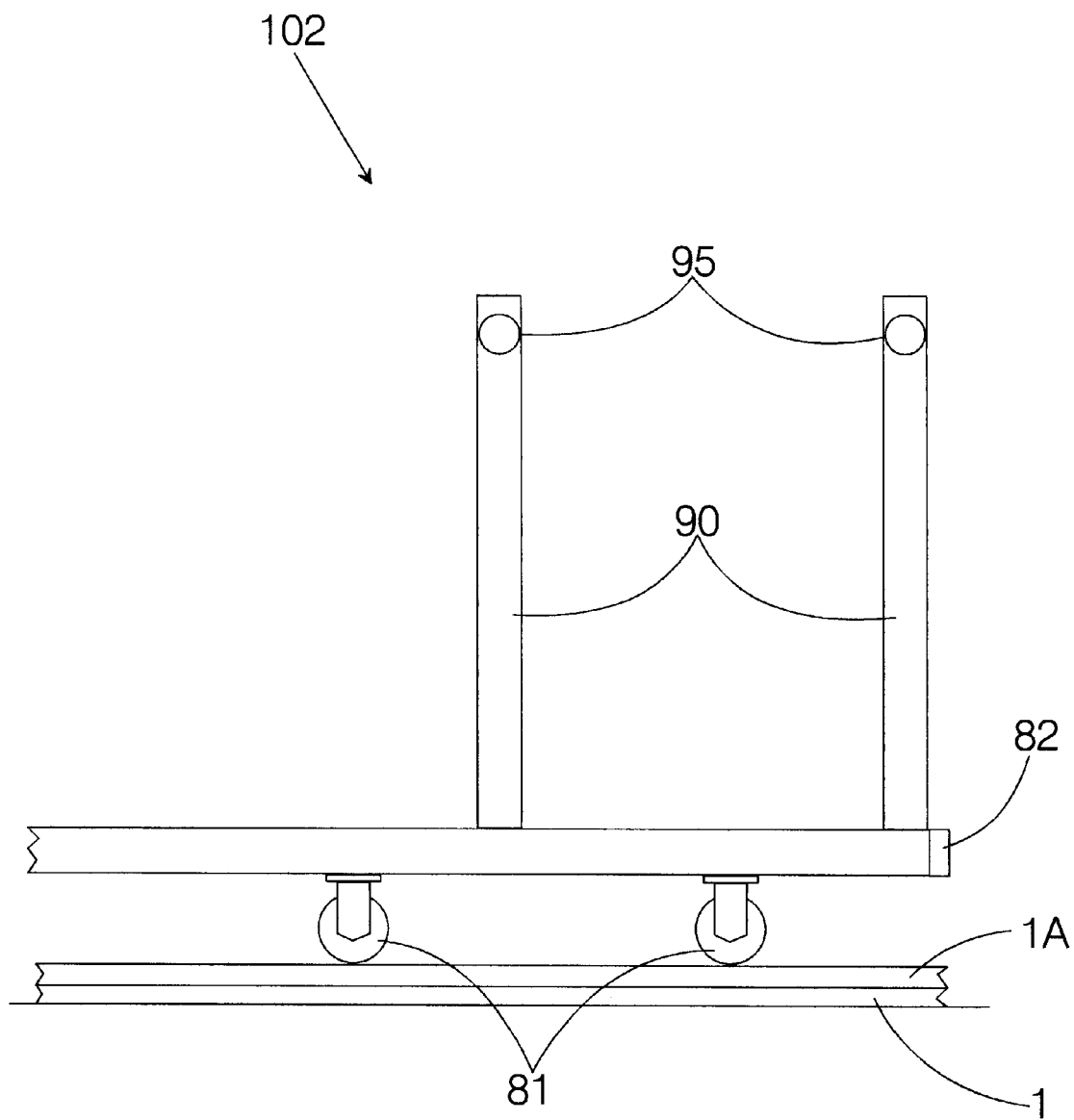
FIG. 7 shows an partial view of an embodiment according to the invention having fixed casters.

FIG. 7 shows a partial view of a third embodiment according to the invention. A sled 102 is similar to sled 100 shown in FIG. 1, with the exception that fixed casters 81 provide the rolling means for the sled 102, rather than retractable casters. In order to distribute the point load from the casters on the floor of the container 1, the container is modified with a reinforcing means 1A, which, in the embodiment shown in FIG. 7, is ¼" steel reinforcing plate along the sides of the floor of the container 1. Elastic bumpers 82 are attached to each end of the sled 102. The overall length of the sled 102 with the bumpers 82 is slightly longer than the inside length of the container 1. The bumpers 82 provide sufficient elasticity that, when the sled 102 is stuffed into the container 1 and the container door closed, the bumpers 82 will fit snugly up against the end walls of the container 1 and prevent the sled 102 from moving in a longitudinal direction relative to the container 1. In general, the elastic bumpers 82 can be used with any embodiment of the sled 100 and 101, as an additional means of securing the load in the container 1, and are shown in FIG. 1 on sled 100 and in FIG. 5 on sled 101.

FIG. 6 schematically depicts a marine terminal 300 that includes a crane area 310, a container yard 320, and a warehouse 210 adapted for use in the method of the present invention. Such adaptation includes the presence of multiple levels 250A–E of sled storage bays 220 as well as a computer-controlled automated storage/retrieval system (AS/RS) 230. For purposes of illustration only, five levels 250A–E are shown. It should be understood, however, that many more levels may be provided. The marine terminal 300 also includes a ship-side loading ramp 340 and a land-side loading ramp 340a positioned on opposite sides of the warehouse 210. Between the ship-side loading ramp 340 and the warehouse 210 is a first enclosed apron 350, and between the land-side loading ramp 340a and the warehouse 210 is a second enclosed apron 350a. It is on these aprons 350, 350a that the stuffing and stripping of a container or the loading/unloading of a yard chassis may take place. The width of the illustrated warehouse 210, by way of example, is five container lengths. The middle forty feet of the width of the warehouse 210 contains the AS/RS 230. This middle area, referred to as the AS/RS area 233, is open the full height of the warehouse 210 so that the AS/RS 230 can deposit/retrieve sleds 100 in a plurality of storage bays 220 on the various levels. The storage bays are the length of two container sleds and rows of storage bays 220 are on either side of the AS/RS area 233 for each level 250A–250E. Certain storage bays on the ground floor of the warehouse 210 are used as passageways 235 for the sleds to be moved into the AS/RS area 233. The AS/RS 230 includes a movable crane 231 that has a satellite 232 that is adapted to hold a sled 100. The AS/RS 230 has enough capacity to lift, store and retrieve a container sled 100 that is loaded to its maximum weight and volume limits to any of the levels 250A–250E and any of the storage bays 220. The warehouse 210 is equipped with sufficient empty container sleds 100, and these are used for export cargo. After cargo has been placed on these empty sleds 100, they are stored in the warehouse 210 awaiting arrival of the ship. In the Preferred Embodiment, the stacking crane AS/RS 230 in the warehouse 210 is computer-controlled. Thus, there is no need to provide access to persons to the warehouse 210, except for maintenance and repair purposes. This provides greater security for storing cargo.

It should be clear that regardless of which embodiment of the apparatus is used—the sled 100 with casters 80, the sled 101 with rails, or the sled 102 with fixed casters 82—the same general system of peripheral equipment will be used, all as just set out.

Although some degree of detail has been given concerning the Preferred Embodiment of the present invention, even to the point of dimensions of the apparatus of the Preferred Embodiment, it is not meant by this illustrative example to limit in any way the overall scope of the present invention.

What is claimed is:

1. Apparatus for stuffing and stripping a standard cargo container, said apparatus comprising:
    a longitudinally extended platform having a platform perimeter and an underside, and
    a plurality of upright members;
    wherein said platform is sized such that said platform perimeter fits snugly within said standard cargo container; and
    wherein each upright member of said plurality of upright members is removably attachable to said platform perimeter.

2. The apparatus of claim 1 further comprising a retractably deployable rolling means depending from said underside of said platform, wherein said rolling means includes a plurality of casters.

3. The apparatus of claim 2, wherein said rolling means further comprises a caster retraction-deployment assembly that includes a channel pair having an upper channel and a lower channel, wherein said plurality of casters depend from said lower channel and said lower channel is slidingly received by said upper channel.

4. The apparatus of claim 3, wherein said caster retraction-deployment assembly further includes a pair of ramp-blocks, wherein a first ramp-block of said pair of said ramp-blocks is disposed on said lower channel and a second ramp-block of said pair is disposed on said upper channel, and wherein, when said lower channel is moved relative to said upper channel, said second ramp-block is slidingly receivable by said first ramp-block.

5. The apparatus of claim 4, wherein said caster retraction-deployment assembly further includes a threaded rod extending a longitudinal length along said underside of said platform, a plurality of threaded collars threadedly disposed around said threaded rod, and a plurality of transverse rods, wherein a first end of each transverse rod of said plurality of rods is connected to a corresponding one of said threaded collars and a second end of each said transverse rod is connected to said platform, and wherein each of said plurality of threaded collars is forced to move along said threaded rod as said threaded rod is turned.

6. The apparatus of claim 1, further comprising a plurality of guide rollers evenly spaced around said platform perimeter.

7. The apparatus of claim 6, wherein each guide roller of said plurality of guide rollers is spring-loaded.

8. The apparatus of claim 1 wherein said upright members are spaced at even intervals around said platform perimeter.

9. The apparatus of claim 1, wherein said upright member has an upper end and an outer face, and wherein a guide roller with a rolling surface is disposed at said upper end such that said rolling surface extends outward from said outer face.

10. Apparatus of claim 1, wherein said container includes a standard cargo container, a refrigerated container, and a truck trailer.

11. The apparatus of claim 1 further comprising a non-retractably deployable rolling means depending from said underside of said platform, wherein said rolling means includes a plurality of fixed casters.

12. Apparatus for loading cargo for shipment, said apparatus comprising:

a sled; and a modified cargo container;

wherein said sled includes a platform with a platform perimeter, a platform longitudinal axis, and a platform underside, and two or more longitudinal rails depending from said platform underside, each of said longitudinal rails extending parallel to said longitudinal axis of said platform, wherein said modified cargo container is a standard cargo container with an inner container perimeter, a container longitudinal axis, and a floor, wherein said standard cargo container is modified to include a plurality of rows of rollers mounted on said floor for guiding said longitudinal rails, each of said rows disposed substantially parallel to said container longitudinal axis, and wherein said plurality of rows of rollers includes a double row of floor rollers, wherein a first row of said double row is spaced a distance from a second row of said double row such that one rail of said two or more longitudinal rails is receivable within said double row, thereby guiding said sled when said sled is introduced or removed from said modified cargo container, and wherein said sled is sized so as to fit snugly within said inner container perimeter and said sled is slidably receivable on said floor.

13. Apparatus of claim 12, wherein said sled has two ends and bumpers are placed on said two ends so as to prevent said sled from moving in a longitudinal direction inside said modified cargo container when said container is closed.

14. Apparatus of claim 13, wherein bumpers of elastically compressible material.

15. Apparatus of claim 12, wherein said modified cargo container includes a refrigerated container and a truck trailer.

* * * * *